United States Patent [19]

Miller

[11] 4,251,980
[45] * Feb. 24, 1981

[54] CORNSTALK HARVESTING AND WINDROW ATTACHMENT FOR A CORN PICKER HEADER

[76] Inventor: Kent A. Miller, R.R. 1, Brandon, Iowa 52210

[*] Notice: The portion of the term of this patent subsequent to Apr. 10, 1996, has been disclaimed.

[21] Appl. No.: 23,647

[22] Filed: Mar. 26, 1979

Related U.S. Application Data

[63] Continuation-in-part of Ser. No. 783,707, Apr. 1, 1977, Pat. No. 4,148,175.

[51] Int. Cl.³ ............................................. A01D 45/02
[52] U.S. Cl. ..................................... 56/14.4; 56/13.7; 56/14.3; 56/98; 56/192
[58] Field of Search ..................... 56/98, 99, 192, 119, 56/13.7, 13.8, 14.1–14.5, 158, 2, 97, 66

[56] References Cited

U.S. PATENT DOCUMENTS

| | | | |
|---|---|---|---|
| 1,905,410 | 4/1933 | Innes | 56/13.8 |
| 2,760,326 | 8/1956 | Smith | 56/192 |
| 2,827,745 | 3/1958 | Taylor | 56/192 |
| 4,137,695 | 2/1979 | Sammann | 56/119 |
| 4,148,175 | 4/1979 | Miller | 56/14.4 |

*Primary Examiner*—Jay N. Eskovitz
*Attorney, Agent, or Firm*—Zarley, McKee, Thomte, Voorhees & Sease

[57] ABSTRACT

A self-propelled combine includes a corn picker head having a cornstalk harvesting and windrow attachment on its underside which includes gathering guide fingers for each row for feeding stalks into a sickle cutter and either a paddle reel or rotary cutter forwardly of augers which optionally convey cut stalks to a centrally positioned discharge whereby the stalks are dropped onto the ground in a windrow or upon opening of a gate rearwardly of the augers the stalks are discharged directly onto the ground. A gathering chain is provided on one of the guide fingers for each row and includes upper and lower sections with the lower return section being displaced laterally outwardly away from the stalks engaged by the upper section. The sickle cutter is positioned rearwardly of the forward end of the snapping rollers and cutting of the stalks occurs after the stalks are engaged by the snapping rollers which rotate inwardly and downwardly.

18 Claims, 15 Drawing Figures

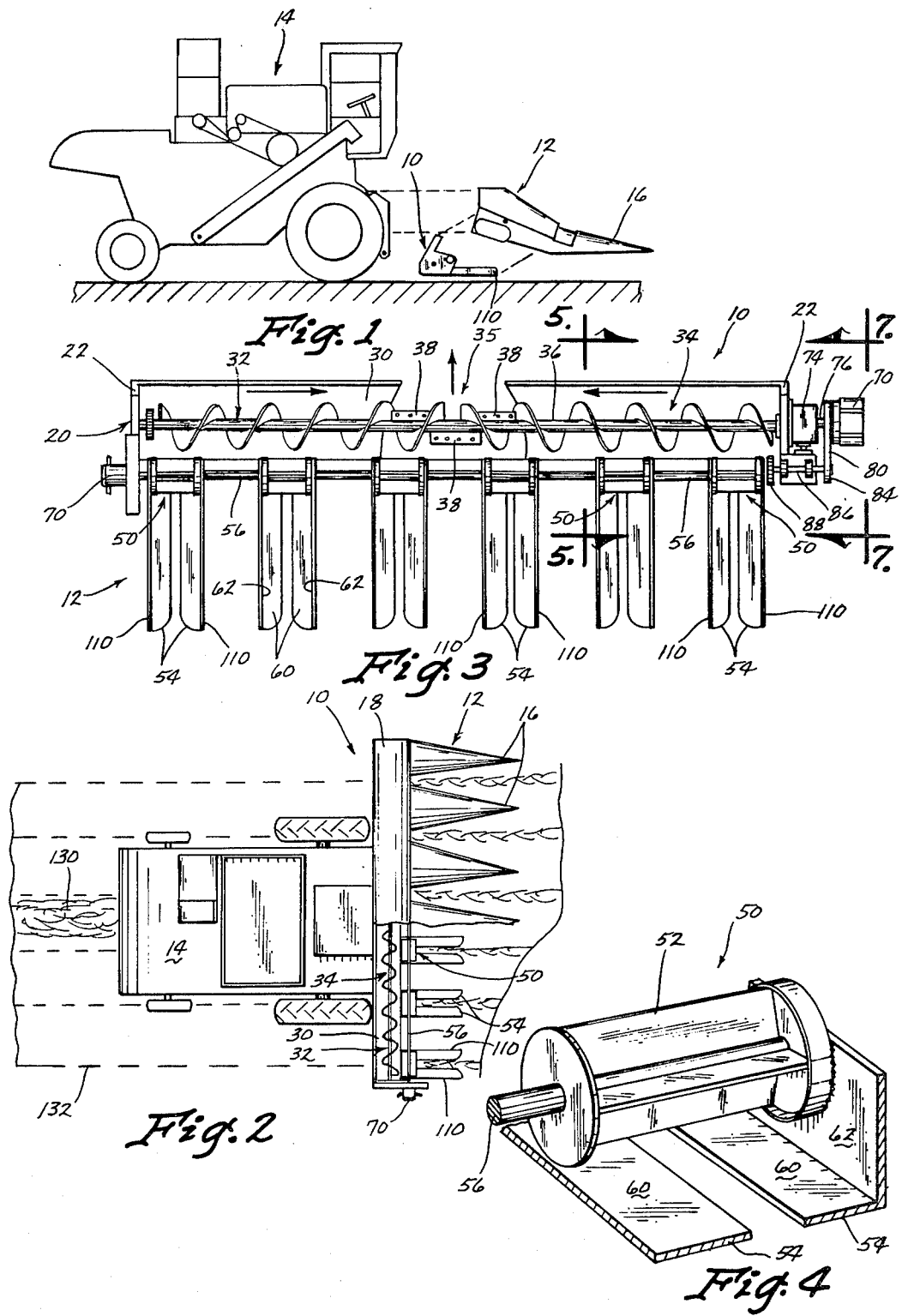

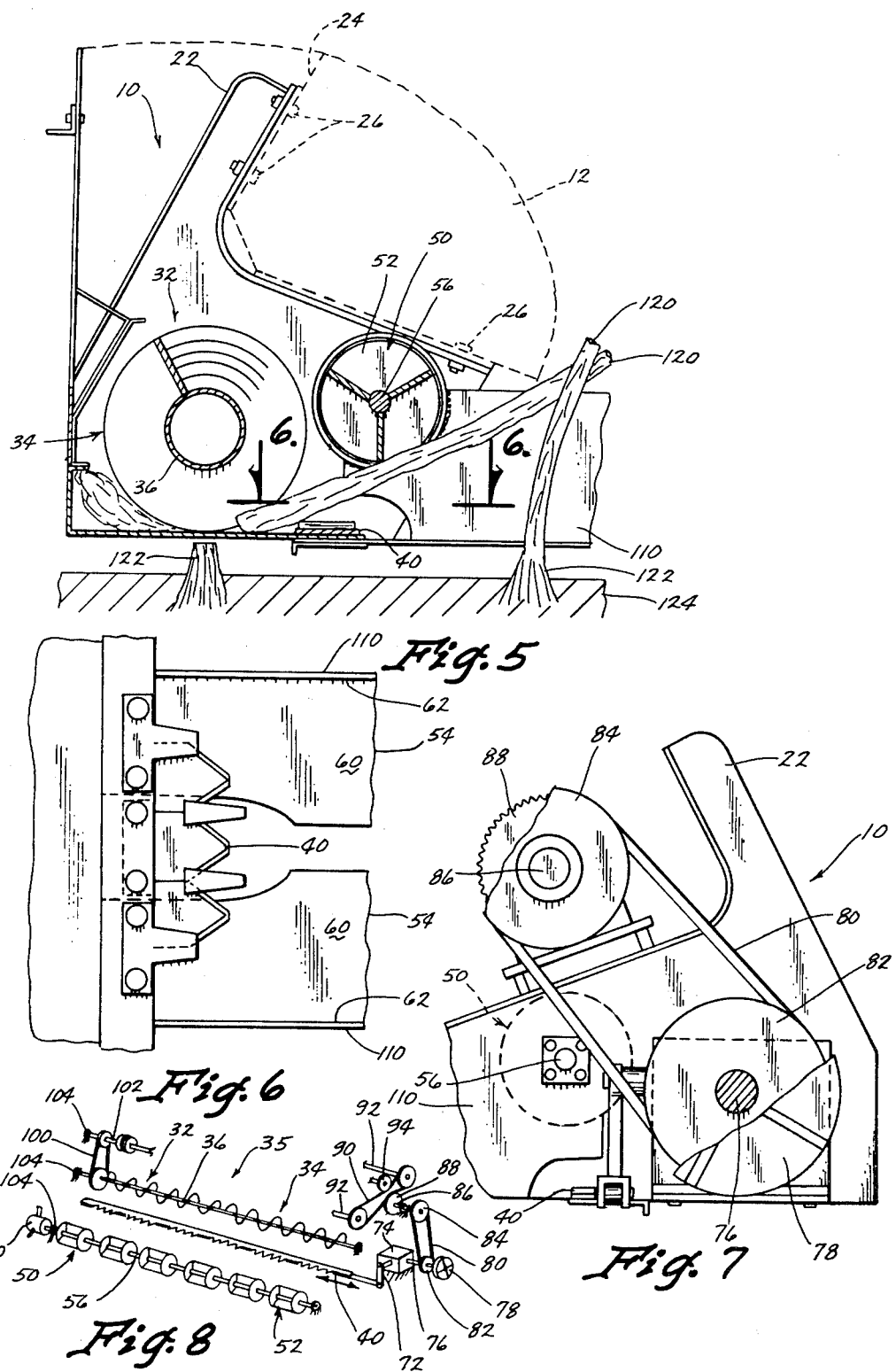

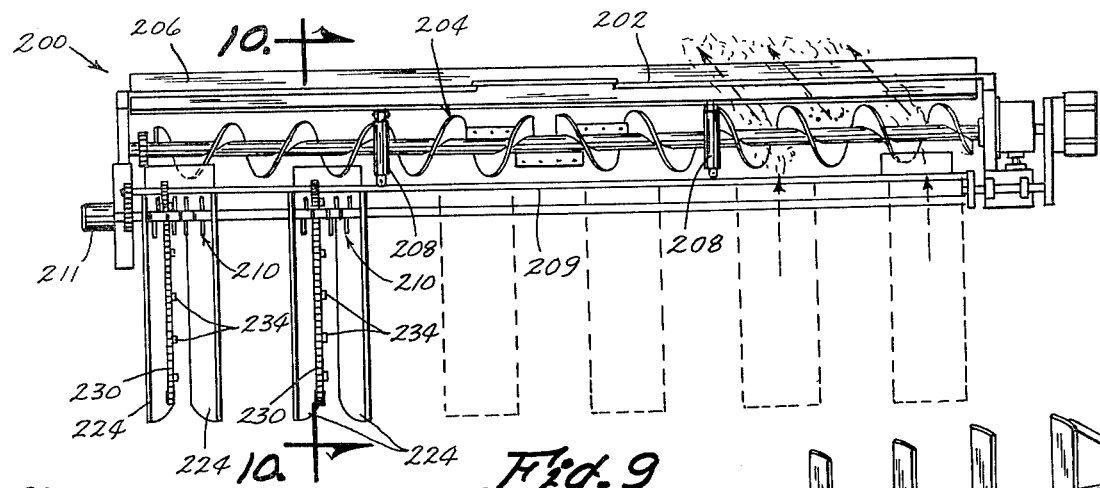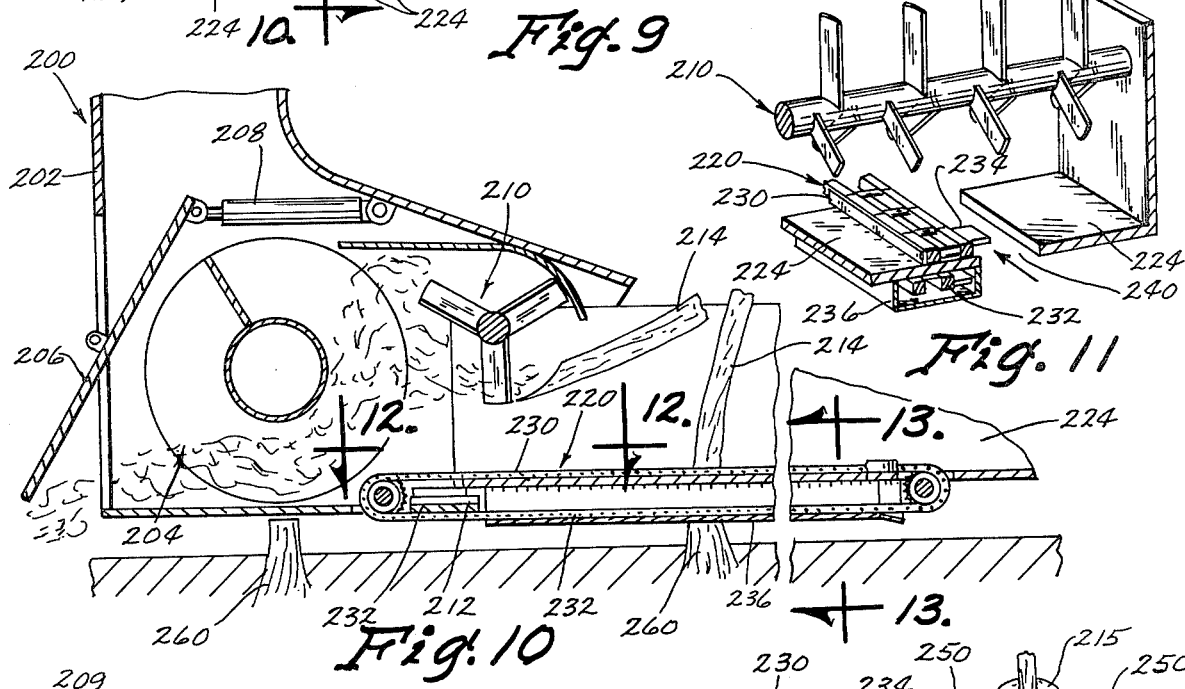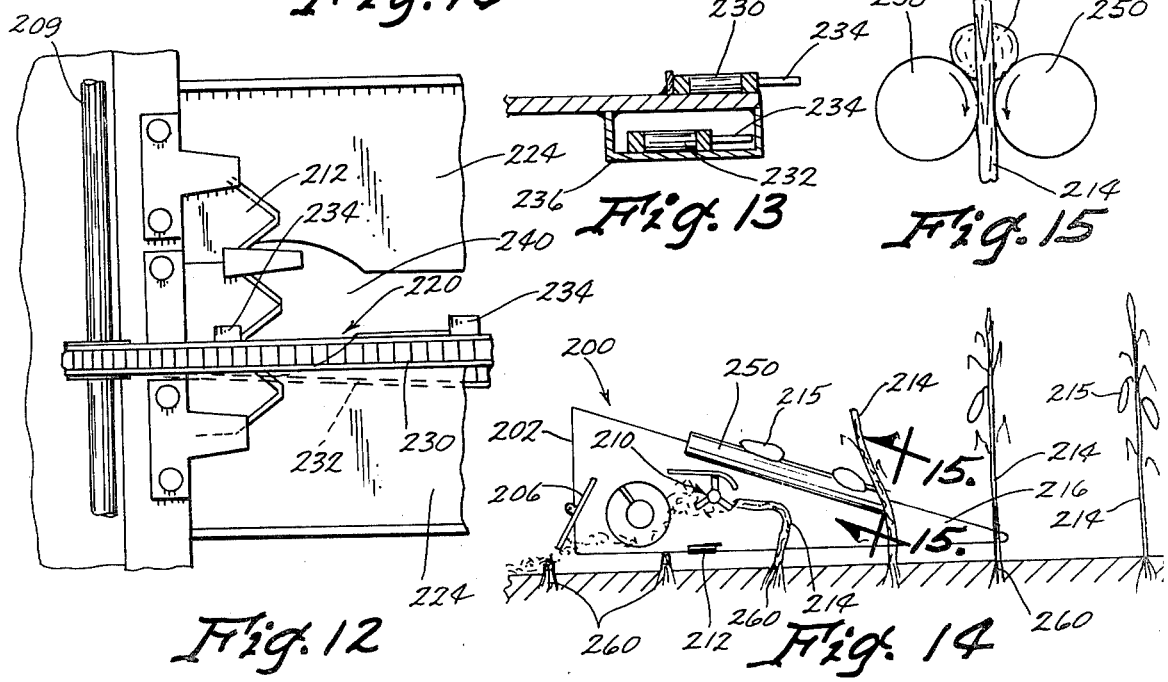

CORNSTALK HARVESTING AND WINDROW ATTACHMENT FOR A CORN PICKER HEADER

This is a continuation-in-part application of application Ser. No. 783,707, Apr. 1, 1977, issuing Apr. 10, 1979 as U.S. Pat. No. 4,148,175.

BACKGROUND OF THE INVENTION

This invention relates to combining of the ear of corn as well as the windrowing of the cornstalks. Conventionally, corn pickers remove the ears from the stalks and process those ears on through the machine, while leaving the stalks flattened against the ground while still secured to their root structure. The stalks left in this condition are difficult to pick up and utilize for corn fodder or silage. It is thus desirable that a machine be provided that will not only remove the ears of corn from the stalks but cut the stalks and put them into a windrow whereupon they can be easily picked up and utilized as desired, such as by being processed through a chopping machine. Optionally, it may be desirable to spread the cut stalks directly back onto the ground and additionally, it may be desirable to shred the cut stalks before they are placed on the ground. The attachment thus should have the capability of shredding, windrowing and returning the stalks directly to the ground.

Gathering chains for feeding the stalks into the cutters heretofore have been horizontally disposed and require complicated drive systems and thus there should be provision for a vertically disposed gathering chain having upper and lower sections.

The snapping rollers should engage the stalks first before the stalks are cut.

Prior Art

The following prior art patents are representative of the known corn header disclosures in addition to the prior art patents cited as references in U.S. Pat. No. 4,148,175.

| U.S. Pat. No. | Date of Issue | Inventor |
| --- | --- | --- |
| 1,908,952 | 5-16-33 | M. K. Brown |
| 2,333,901 | 11-9-43 | C. E. Swenson |
| 2,385,193 | 9-18-45 | K. H. Burgin |
| 2,491,195 | 12-13-49 | R. P. Messenger et al |
| 2,511,960 | 6-20-50 | N. F. Andrews |
| 2,517,401 | 8-1-50 | L. P. Millard et al |
| 2,770,087 | 11-13-56 | L. W. Hurlbut |
| 3,470,682 | 10-7-69 | T. Evans |

The above listed patents are similar to the prior art cited in U.S. Pat. No. 4,148,175 for the reason that they teach cutting the plant and processing the plant stalks through the header and combine whereupon the stalk is returned to the ground. The cutting occurs before the snapping rollers, if any, engage the stalks. No separate guide fingers or gathering chains on guide fingers are provided below gathering shoes for guiding stalks into rearwardly disposed cutters.

SUMMARY OF THE INVENTION

In accordance with the present invention, the conventional combine having a corn picker header is utilized by adding to it on the lower side an attachment which will cut and windrow the cornstalks as the ears of corn are being removed in a conventional manner. The attachment is secured to the frame of the header by finger mounting brackets at opposite ends of the attachment positioned on the back side of the header and by forwardly extending gathering guide fingers being connected to the header gathering shoes thereabove. The attachment includes a sickle bar and paddle reel ahead of oppositely extending augers which feed cut stalks to the center of the attachment for discharge as a windrow along the center line and beneath the combine. The paddle reel is driven by the hydraulic motor normally used for the combine reel, while the sickle bar and augers are driven by the snapping roller drive shafts and operate in timed relationship therewith.

The stalks are engaged by the inwardly and downwardly turning snapping rollers before the stalks are cut by the cutter positioned rearwardly of the forward end of the snapping rollers. A vertically disposed gathering chain is provided on one of the gathering guide fingers and includes a return lower section in a track which displaces the lower section out of the path of the stalks such that the stalks are engaged only by the upper gathering chain section. A chopper is provided above the cutter to chop the stalks, if desired. Every wall of the auger enclosure is provided with a gate which is hydraulically operated to allow the stalks to fall directly back onto the ground rather than being conveyed to a windrow discharge. The auger functions to convey the stalks rearwardly and slightly laterally when the gate is open and laterally only when the gate is closed.

DESCRIPTION OF THE DRAWINGS

FIG. 1 is an exploded side elvation view of a self-propelled harvesting vehicle having a corn picker head with the attachment of this invention positioned thereбеneath.

FIG. 2 is a top plan view thereof with the corn picker head and windrow attachment in operating position.

FIG. 3 is a top plan view of the windrow attachment only.

FIG. 4 is a fragmentary perspective view of a paddle reel and gathering guide fingers for one corn row.

FIG. 5 is a cross-sectional view taken along line 5—5 of FIG. 3.

FIG. 6 is a cross-sectional view taken along line 6—6 of FIG. 5.

FIG. 7 is an elevational view taken along line 7—7 of FIG. 3.

FIG. 8 is a diagrammatic representation of the driving system for operating the paddle reel, sickle bar and auger.

FIG. 9 is a top plan view of an alternate embodiment of the windrow attachment.

FIG. 10 is a cross-sectional view taken along line 10—10 of FIG. 9.

FIG. 11 is a fragmentary perspective view of the rotary cutter and guide finger gathering chain.

FIG. 12 is a cross-sectional view taken along line 12—12 of FIG. 10.

FIG. 13 is a cross-sectional view taken along line 13—13 in FIG. 9.

FIG. 14 is an elevational view similar to FIG. 10 but showing the attachment in operation and its relationship to the snapping rollers.

FIG. 15 is a cross-sectional view taken along line 15—15 of FIG. 14.

DESCRIPTION OF THE PREFERRED EMBODIMENT

The harvesting and windrow attachment of this invention is referred to generally in FIG. 1 by the reference numeral 10 and is shown positioned below a corn picker header 12 carried by a self-propelled combine harvesting vehicle 14. The corn picker header includes gathering shoes 16, and a frame 18.

The windrow attachment 10 includes a frame 20 having upstanding mounting finger brackets 22 at the opposite rear corners for connection to the rear lower side 24 of the header 12, as seen in FIG. 5. The connection is made by two mounting bolts for each of the mounting finger brackets 22 and a third bolt 26 which connects adjacent horizontal end surfaces of the header 12 and the attachment 10.

The rear of the attachment 10 includes a conveying trough or pan 20 in which oppositely disposed inwardly conveying solid fighting auger portions 32 and 34 are positioned to convey material to a centrally located discharge opening 35. The auger portions 32 and 34 are on a common auger shaft 36 having paddle portions 38 at the center discharge opening 35.

Forwardly of the auger portions 32 and 34 is a sickle bar 40 and thereabove is a reel 50 having a plurality of paddle units 52 for each corn row. A pair of gathering guide fingers 54 is provided for each row of corn directly forward of each paddle unit 52. Reel 50 includes a shaft 56 on which each of the paddle units 52 is mounted. Each of the gathering guide fingers 54 include horizontal and vertical legs 60 and 62, respectively.

In FIG. 8 the power system for driving the reel 50, sickle 40 and augers 32 and 34 is shown. The reel shaft 56 is driven by a hydraulic motor 70 which is utilized for driving the combine reel when the attachment 20 has been removed and the grain harvesting header is in place of the corn header 12. The sickle 40 is connected to a pittman 72 in turn connected by a gear box 74 having an input shaft 76 on which a clutch 78 is provided for engaging and disengaging a belt 80 extending between a pulley 82 on the shaft 76 and a pulley 84 on the snapping roller drive shaft 86. The drive shaft 86 includes a sprocket 88 in engagement with an endless chain 90 connected to conventional snapping roller shafts 92. A chain tightener sprocket 94 is also provided.

The augers 32 and 34 on the common shaft 36 are driven by a chain 100 connected to a snapping roller drive shaft 102. The shafts 36 and 102 are mounted in bearings 104.

Thus, it is seen in operation that the attachment 10 may be quickly attached or removed from the corn picker header 12 by operation of the mounting bolts 26, as seen in FIG. 5, and also the single mounting bolts 110 on each gathering finger 54 at its forward end. The power is supplied from existing power sources on the corn picker header, including the snapping roller shafts at opposite ends of the corn picker header, and through further utilization of the hydraulic motor 70 for the combine reel (not shown). The stalks 120 having roots 122 in the ground 124 are guided between the gathering fingers 54 and are fed under the individual paddle units 52 into engagement with the cutter bar 40 wherein the stalks 120 are severed from their roots 122 and then fed into the augers 32 and 34 whereupon they are conveyed to the center discharge opening 34 for discharge onto the ground as a windrow 130 as seen in FIG. 2 at the center line of the self-propelled harvester vehicle 14. The machine illustrated will harvest ear corn and windrow stalks from six rows 132, as seen in FIG. 2. The windrow 130 may now be utilized in a conventional manner such as by being picked up by a cornstalk chopper and processed for silage or the like.

The attachment of FIGS. 9–15 is referred to generally in FIG. 9 by the reference numeral 200 and will be described only in that detail which distinguishes it from the attachment 10 of FIGS. 1–8.

An enclosure 202 for the auger 204 includes a gate 206 pivotally movable between opened and closed positions by hydraulic cylinders 208 for discharge of stalks by the auger 204 rearwardly and slightly inwardly, as seen in FIG. 9.

A rotary chopper cutter 210 is provided above the cutter 212 to chop the stalks 214 fed into the auger 204 for discharge in a windrow, as shown in the embodiment of FIGS. 1–8 or directly onto the ground through the gate 206.

A gathering chain 220 is provided on one of the guide fingers 224 to assist in feeding the stalks 214 into the cutter 212 and includes an upper section 230 and a return lower section 232. Laterally extending fingers 234 are provided on selected chain lengths for engaging the cornstalks between the gathering guide fingers 224. A channel track 236 is provided for the return chain section 232 and is displaced laterally outwardly of the upper chain section 230 to move the chain out of the passageway 240 between the guide fingers 224 so that the fingers 234 on the upper section only engage the stalks to move them into the cutters 212. A single shaft 209 carries sprockets for driving each of the gathering chains 220 and it is powered by a motor 211. It is seen that the vertical arrangement of the gathering chain 220 eliminates the need for complicated bearing drive mechanisms which would be required if the gathering chains were arranged in a conventional horizontal plane.

In FIG. 14 it is seen that the cutter 212 is positioned rearwardly of the forward end of the snapping rollers 250 on the header gathering shoe 216 such that the stalks 214 are engaged by the inwardly and downwardly turning rollers 250 before the stalks are cut by the cutter 212. It is seen that the snapping rollers pull the stalks downwardly removing corn 215 and tend to accumulate the stalks beneath the snapping rollers. The guide fingers below the snapping rollers help to keep the cutters 212 clear of tangled stalks so that they may make a clean cut on the stalk adjacent the root structure 260.

Thus it is seen in operation that the stalks may be selectively windrowed by maintaining the gate 206 in a closed vertical position or fed directly onto the ground by opening the gate 206. Operation of the auger 204 will feed the stalks cut or shredded rearwardly out the gate onto the ground. The shredder 210 may optionally be utilized and also functions as the paddle unit reel 52 of FIG. 4 to facilitate feeding of the stalks into the cutters 212 and in the embodiment of FIGS. 9–15 feeding of the cutters is assisted by the gathering chain on one of the guide fingers.

What is claimed is:

1. In combination a corn picker header and cornstalk harvesting attachment comprising,
 a corn picker header having an elongated header frame, and forwardly extending gathering shoes with inwardly and downwardly turning snapping rollers, a cornstalk harvesting attachment positioned under said header and having an attachment frame connected to said header frame, a stalk cutting means positioned rearwardly of the forward end of said snapping rollers and extending the substantial length of said attachment frame for cutting stalks, and forwardly extending gathering guide fingers are provided below said gathering shoes ahead of said cutting means for each corn row to guide stalks into said cutting means whereby stalks are cut after stalks have been engaged by said snapping rolls.

2. The structure of claim 1 wherein said attachment includes an opening rearwardly of said cutting means for allowing said stalks to move rearwardly onto the ground.

3. The structure of claim 1 wherein chopping means is provided closely adjacent said cutting means for chopping stalks.

4. The structure of claim 1 wherein a gathering chain is provided on one of said gathering guide fingers for moving stalks rearwardly into said cutting means.

5. The structure of claim 4 wherein said gathering chain includes laterally extending fingers for engaging stalks.

6. The structure of claim 5 wherein said gathering chain is endless and includes upper and lower sections moving in opposite directions, and guide means are provided for deflecting one of said sections outwardly away from the stalks while the fingers on the other section engage the stalks to move them to said cutting means.

7. The structure of claim 1 wherein a conveyor is provided to receive cut stalks and extends the substantial length of said attachment and power means is connected to said conveyor for selectively moving stalks to a discharge means to be discharged in a windrow.

8. The structure of claim 7 wherein a gate means movable between open and closed positions is provided for said opening to selectively move said stalks through said opening when said gate is open and move said stalks by said conveyor to said discharge means when said gate is closed.

9. The structure of claim 8 wherein said conveyor means is an auger and when said gate is open said auger moves stalks across it and rearwardly out said opening and when said gate is closed said auger moves stalks to said discharge means.

10. In combination a corn picker header and cornstalk harvesting and windrow attachment comprising, a corn picker header having an elongated header frame, a cornstalk harvesting and windrow attachment positioned under said header and having an attachment frame connected to said header frame, conveyor means extending the substantial length of said attachment frame for selectively conveying corn stalks to a discharge means, and said conveyor means includes an enclosure having a closable opening for selective discharge of stalks directly onto the ground, and a stalk cutting means positioned ahead of said conveyor means and extending the substantial length of said attachment frame for cutting stalks to be received by said conveyor means whereby they are conveyed to said discharge means and discharged rearwardly as a windrow or are received by said closable opening when open for discharge onto the ground.

11. The structure of claim 10 wherein said conveyor means is an auger and said closable opening is in a rear wall of said enclosure opposite said cutting means whereby when said closable opening is open said stalks move under said auger rearwardly and laterally out said closable opening onto the ground.

12. The structure of claim 10 wherein chopping means is provided closely adjacent said cutting means for chopping stalks.

13. The structure of claim 10 wherein forwardly extending gathering guide fingers are provided below said gathering shoes ahead of said cutting means for each corn row to guide stalks into said cutting means whereby stalks are cut after stalks have been engaged by said snapping rolls, and a gathering chain is provided on one of said gathering guide fingers for moving stalks rearwardly into said cutting means.

14. The structure of claim 13 wherein said gathering chain includes laterally extending fingers for engaging stalks.

15. The structure of claim 14 wherein said gathering chain is endless and includes upper and lower sections moving in opposite directions, and guide means are provided for deflecting one of said sections outwardly away from the stalks while the fingers on the other section engage the stalks to move them to said cutting means.

16. The structure of claim 10 wherein forwardly extending gathering guide fingers are provided ahead of said cutting means for each corn row to guide stalks into said cutting means.

17. The structure of claim 10 wherein said conveyor means is further defined as an auger having opposite screw portions for feeding stalks to said centrally positioned discharge means.

18. The structure of claim 10 wherein said header includes forwardly extending gathering shoes with inwardly and downwardly turning snapping rollers, and said stalk cutting means is positioned rearwardly of the forward end of said snapping rollers whereby stalks are engaged by said snapping rollers before they are cut by said cutting means.

* * * * *